United States Patent [19]
Shida et al.

[11] Patent Number: 5,809,084
[45] Date of Patent: Sep. 15, 1998

[54] DATA RECEIVING IN A DIGITAL MOBILE COMMUNICATION

[75] Inventors: Kazuo Shida; Mitsuru Uesugi, both of Yokohama, Japan

[73] Assignee: Matsushita Electric Industrial Co., Ltd., Osaka, Japan

[21] Appl. No.: 691,046

[22] Filed: Aug. 1, 1996

[30] Foreign Application Priority Data

Aug. 4, 1995 [JP] Japan .................... 7-199785

[51] Int. Cl.⁶ .............. H03K 9/00; H03D 3/22; H04B 7/216; H04B 3/36
[52] U.S. Cl. ............ 375/316; 375/323; 375/329; 455/7; 455/14; 370/342
[58] Field of Search ................ 375/316, 329, 375/331, 334, 222, 326, 324, 323, 338, 339, 229; 370/342; 455/17, 7, 21, 14

[56] References Cited

U.S. PATENT DOCUMENTS

| | | | |
|---|---|---|---|
| 5,081,462 | 1/1992 | Tachita et al. | 375/200 |
| 5,136,612 | 8/1992 | Bi | 375/200 |
| 5,257,291 | 10/1993 | Desperben et al. | 375/329 |
| 5,648,986 | 7/1997 | Tatsumi et al. | 375/229 |

FOREIGN PATENT DOCUMENTS 5-68062 3/1993 Japan .

OTHER PUBLICATIONS

"Physical Layer on the Radio Path: General Description"; European digital cellular telecommunication system (phase 1); Feb. 1992; pp., 1–11.

*Primary Examiner*—Chi H. Pham
*Assistant Examiner*—Khai Tran
*Attorney, Agent, or Firm*—Lowe Hauptman Gopstein Gilman & Berner

[57] ABSTRACT

A data receiving system has a radio frequency unit for demodulating a series of signals transmitted at a carrier wave frequency, a local oscillating unit for generating a demodulating frequency used for the demodulation of the series of signals, an equalizing unit for removing a distortion of the series of signals demodulated in the radio frequency unit, a phase shift estimating unit for taking out phase information from the series of signals, calculating a time changing rate of the phase information and estimating a phase shift caused by a difference between the carrier wave frequency and the demodulating frequency according to the time changing rate, and a correcting unit for correcting the series of signals transmitted from the equalizing unit according to the phase shift to remove the phase shift from the series of signals. Accordingly, because the phase shift is estimated by using the phase information placed in the series of signals, an influence of a bit pattern of a series of training bits arranged in the series of signals can be removed.

8 Claims, 3 Drawing Sheets

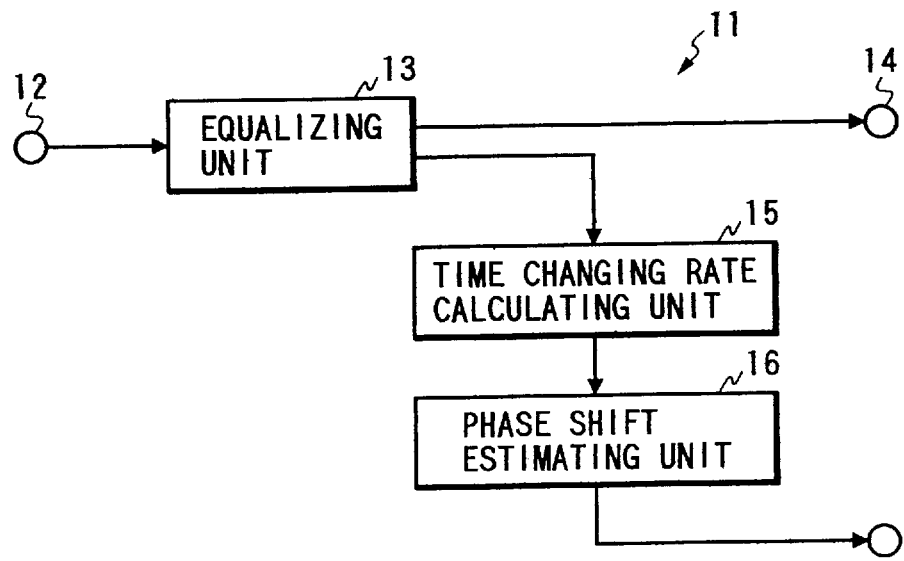
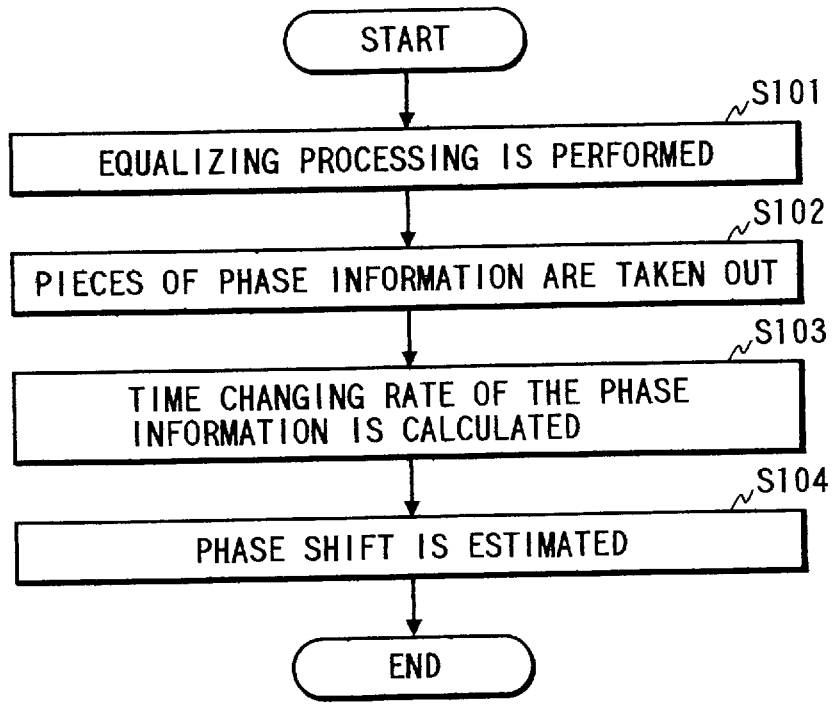

(NUMERAL) INDICATES THE NUMBER OF BITS

DATA RECEIVING IN A DIGITAL MOBILE COMMUNICATION

BACKGROUND OF THE INVENTION

1. Field of the Invention

The present invention relates to a data receiving system in which a phase shift between a transmitting unit and a receiving unit is estimated not to be influenced by a noise or a multi-path phasing occurring in a radio circuit in a digital mobile communication performed by using a digital portable telephone or the like according to a time division multiple access method.

2. Description of the Related Art

In a digital radio communication, in cases where a frequency offset (or a frequency difference) denoting a phase shift between a transmitting unit and a receiving unit occurs, a bit error rate indicating a receiving quality is increased. Therefore, it is important to compensate for the frequency offset.

In a phase shift keying in which information is transmitted in correspondence to a phase $\theta(t)$, a carrier wave $E(t)$ is expressed as follows.

$$E(t) = E^* \cos\{\omega_c{}^*t + \theta(t)\}$$

Here $\omega_c$ denotes an angular frequency of the carrier wave.

Also, in a quadrature phase shift keying, two carrier waves having phases different from each other by $\eta/2$ are phase-modulated in each of two groups, at least four types of data obtained by combining the carrier waves of the two groups are transmitted to a data receiving system.

In cases where any phase shift caused by a frequency difference between a carrier wave frequency on a data transmission side and a frequency in an oscillating unit used for the demodulation of a received signal on a receiving side does not occur, an in-phase component (or a real number component) Ri and a quadrature component (an imaginary number component) Rq of a received signal demodulated on the receiving side are expressed as follows.

$$\begin{aligned}
Ri(t) &= E^*\cos\{\omega_c{}^*t + \theta(t)\}^*\cos(\omega_c{}^*t) \\
&= 1/2^*E^*\cos\theta(t) + 1/2^*E^*\cos\{2^*\omega_c{}^*t + \theta(t)\} \\
Rq(t) &= E^*\cos\{\omega_c{}^*t + \theta(t)\}^*\sin(\omega_c{}^*t) \\
&= 1/2^*E^*\sin\theta(t) + 1/2^*E^*\sin\{2^*\omega_c{}^*t + \theta(t)\}
\end{aligned}$$

In the above equations, because the second terms are suppressed by a low pass filter on the receiving side, the received signal obtained on the receiving side are expressed as follows.

$$Ri(t) = 1/2^*E^*\cos\theta(t)$$

$$Rq(t) = 1/2^*E^*\sin\theta(t)$$

In a data receiving unit, a combination of the in-phase component Ri(t) and the quadrature component Rq(t) determined in each of four cases $\theta(t)=0$, $\theta(t)=\eta/2$, $\theta(t)=\eta$ and $\theta(t)=-\eta/2$ is distinguished. That is, four pieces of information (Ri,Rq)=(E/2,0), (0,E/2), (-E/2,0) and (0,-E/2) are distinguished, and four symbols corresponding to the four combinations are decoded.

In contrast, in cases where a frequency difference $\omega_d$ between a carrier wave frequency on the data transmission side and a frequency in the oscillating unit on the receiving side occurs, the in-phase component Ri and the quadrature component Rq of a received signal demodulated on the receiving side are expressed as follows.

$$\begin{aligned}
Ri(t) &= E^*\cos\{\omega_c{}^*t + \theta(t)\}^*\cos\{(\omega_c + \omega_d)^*t\} \\
&= 1/2^*E^*\cos\{\theta(t) - \omega_d{}^*t\} + 1/2^*E^*\cos\{2\omega_c{}^*t + \omega_d{}^*t + \theta(t)\} \\
Rq(t) &= E^*\cos\{\omega_c{}^*t + \theta(t)\}^*\sin\{(\omega_c + \omega_d)^*t\} \\
&= 1/2^*E^*\sin\{\theta(t) - \omega_d{}^*t\} + 1/2^*E^*\sin\{2\omega_c{}^*t + \omega_d{}^*t + \theta(t)\}
\end{aligned}$$

In the above equations, because the second terms are suppressed by the low pass filter on the receiving side, the received signal obtained on the receiving side are expressed as follows.

$$Ri(t) = 1/2^*E^*\cos\{\theta(t) - \omega_d{}^*t\}$$

$$Rq(t) = 1/2^*E^*\sin\{\theta(t) - \omega_d{}^*t\}$$

Therefore, in cases where the frequency difference $\omega_d$ between the carrier wave frequency on the data transmission side and the frequency in the oscillating unit on the receiving side occurs, a phase shift expressed by a first order term $-\omega_d{}^*t$ is mixed in the received signal. Therefore, it is required to estimate the first order term $-\omega_d{}^*t$, to compensate for the first order term $-\omega_d{}^*t$ and to distinguish the four pieces of information (Ri,Rq)=(E/2,0), (0,E/2), (-E/2,0) and (0,-E/2) in the data receiving system.

In a conventional data receiving system, the first order term $-\omega_d{}^*t$ is estimated by using tap coefficients of an equalizer which is originally arranged to remove distortion of the received signal. As the equalizer, a well-known equalizer composed of an equalizing processing unit of a forward side for predicting current data by using past data previously input and another equalizing processing unit of a backward side for predicting past data by using data input until now is used.

3. Problems to be Solved by the Invention

However, in the conventional data receiving system, in cases where an equalizing training processing is performed for a signal which is transmitted from a transmitting side and has a predetermined fixed pattern (which is called a series of training bits and is one of several bit patterns) in an equalizing training processing unit of the forward side and an equalizing training processing unit of the backward side provided for the equalizer, though tap coefficients are finally determined in the equalizing training processing units, following drawbacks exist.

That is, convergency of the tap coefficients changes with the bit pattern of the series of training bits, and a regular error occurs for each of the bit patterns. In this case, an offset value occurs in a result of the estimation of the phase shift for each of the bit patterns. Therefore, there is a first drawback that it is required to prepare a plurality of table values for correcting the offset value for each of the bit patterns.

Also, in cases where minute errors occur in random because of the influence of noises or multi-path phasing, because a bit interval (or a time interval for a series of training bits) in which the phase shift is detected is shorter than a total burst length, one result of the estimation of the phase shift for one bit pattern considerably differs from that for another bit pattern.

SUMMARY OF THE INVENTION

An object of the present invention is to provide, with due consideration to the drawbacks of such a conventional data receiving system, a data receiving system in which a phase shift caused by a difference between a carrier wave frequency on a data transmitting side and a demodulating frequency on a data receiving side is estimated with a high precision.

The object is achieved by the provision of a data receiving system, comprising:

signal receiving means for receiving a series of data signals having a carrier wave frequency;

demodulating means for demodulating the series of data signals received by the signal receiving means at a demodulating frequency;

time changing rate calculating means for taking out phase information from the series of data signals demodulated by the demodulating means and calculating a time changing rate of the phase information; and phase shift estimating means for estimating a phase shift caused by a difference between the carrier wave frequency of the series of data signals and the demodulating frequency according to the time changing rate of the phase information calculated by the time changing rate calculating means.

In the above configuration, a series of data signals transmitted in a burst structure is received by the signal receiving means and is demodulated by the demodulating means at a demodulating frequency. In this case, because a phase shift is caused by a difference between a carrier wave frequency of the series of data signals and the demodulating frequency, phase information is included in a series of data signals transmitted in a burst structure, and the phase information is taken out from series of data signals to estimate the phase shift. That is, a time changing rate of the phase information is calculated by the time changing rate calculating means, and the phase shift is estimated by the phase shift estimating means according to the time changing rate.

Accordingly, because the phase shift is estimated by using the phase information included in the series of data signals, an adverse influence of a bit pattern of a series of training bits can be avoided.

Also, it is preferred that the phase information be placed at both tail regions of the series of data signals received by the signal receiving means.

In this case, a time interval for the phase information taken out from the both tail regions of the series of data signals is longer than a time period required for a training processing of a series of training bits which is included in the series of data signals. Accordingly, a frequency resolution for a unit of phase shift can be improved, and the adverse influence of minute errors generated in random by noises or multi-path phasing can be suppressed.

BRIEF DESCRIPTION OF THE DRAWINGS

The objects, features and advantages of the present invention will be apparent from the following description taken in conjunction with the accompanying drawings, in which:

FIG. 1 is a block diagram of an equalizer of a data receiving system according to a first embodiment of the present invention;

FIG. 2 is a flow chart showing an operation performed in the equalizer of the data receiving system shown in FIG. 2;

in FIG. 5.

DETAILED DESCRIPTION OF THE EMBODIMENTS

Figure 3:
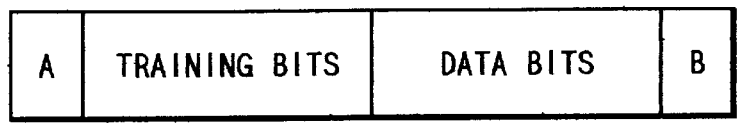
FIG. 3 shows a series of received signals having a burst structure.

Preferred embodiments of a data receiving system according to the present invention in which a phase shift is estimated by using a time changing rate of two pieces of phase information taken out from two fixed bit regions placed at both tails of a stream of received signals are described with reference to drawings.

(First Embodiment)

FIG. 1 is a block diagram of an equalizer of a data receiving system according to a first embodiment of the present invention.

As shown in FIG. 1, an equalizer 11 of a data receiving system comprises an input terminal 12 for inputting a received signal which is transmitted at a carrier wave frequency and is demodulated at a demodulating frequency, an equalizing unit 13 for removing a distortion of the received signal, an output terminal 14 for outputting an equalized signal generated in the equalizing unit 13, a time changing rate calculating unit 15 for taking out phase information from a stream of equalized signals generated in the equalizing unit 13 and calculating a time changing rate of the phase information, a phase shift estimating unit 16 for estimating a phase shift caused by a difference between the carrier wave frequency and the demodulating frequency according to the time changing rate, and a phase shift outputting terminal 17 for outputting data of the phase shift estimated in the phase shift estimating unit 16.

In the above configuration, the estimation of the phase shift is performed according to the procedure shown in FIG. 2.

As shown in FIG. 2, a plurality of received signals are input to the input terminal 12 one after another, the received signals are transmitted to the equalizing unit 13 one after another, and an equalizing processing is performed for each of the received signals in the equalizing unit 13 (step S101). Therefore, a distortion of each of the received signals is removed. Thereafter, a plurality of equalized signals are output to the output terminal 14 and the time changing rate calculating unit 15 one after another. In the time changing rate calculating unit 15, a pair of pieces of phase information are taken out from two fixed bit regions of a stream of the equalized signals (step S102), and a time changing rate of the two pieces of phase information taken out from the stream of the equalized signals is calculated (step S103). Thereafter, a phase shift caused by a frequency difference between a carrier wave frequency on a data transmission side and a demodulating frequency in an oscillating unit used for the demodulation of a received signal on a data receiving side is estimated in the phase shift estimating unit 16 by using the time changing rate (step S104).

For example, as shown in FIG. 3, a pair of pieces of phase information A and B are arranged at both tails of one stream of the received signals (or one stream of the equalized signals) having a burst structure, and a series of training bits and a series of data bits are arranged between the phase information A and B. A phase difference between the phase information A and B is set to a predetermined value. The first phase information A is taken out at a first time T1, and the second phase information B is taken out at a second time T2. In cases where a co-ordinate system O-xy, with the real part, as the x co-ordinate axis and the imaginary part, as the y co-ordinate axis is considered, the first phase information A composed of a first in-phase component Ai and a first quadrature component Aq is placed at a first point $P_A$(Ai, Aq) of the co-ordinate system O-xy, and the second phase information B composed of a second in-phase component Bi and a second quadrature component Bq is placed at a second point $P_B$(Bi, Bq) of the co-ordinate system O-xy. Therefore, a first phase angle of the first phase information A is expressed by $\theta a = \tan^{-1}(Ai/Aq)$, and a second phase angle of the second phase information B is expressed by $\theta b = \tan^{-1}(Bi/Bq)$.

In cases where any phase shift between the data transmission side and the data receiving side does not exist, a phase difference $\theta b - \theta a$ is equal to a prescribed known phase difference $\theta d$. However, in cases where a phase shift between the data transmission side and the data receiving side exists, the phase difference $\theta b - \theta a$ is not equal to the prescribed known phase difference $\theta d$, and a changed angle $\theta ab$ corresponding to a difference between the phase difference $\theta b - \theta a$ and the prescribed known phase difference $\theta d$ is obtained as a time changing rate as follows.

$$(Bi+jBq)/(Ai+jAq)=(AqBq+AiBi)/(Ai^2+Aq^2)+j(AiBq-AqBi)/(Ai^2+Aq^2)$$

$$\theta ab = \tan^{-1}(AiBq-AqBi)/(AgBq+AiBi)-\theta d$$

Therefore, the phase shift between the data transmission side and the data receiving side can be estimated with a high precision according to the time changing rate $\theta ab$.

Also, a time interval T2−T1 for the phase information is longer than a time period required for a training processing of the training bits because the phase information A and B are placed at both tails of a stream of the received signals. A frequency resolution for a unit of phase shift is improved, and the adverse influence of minute errors generated in random by noises or multi-path phasing can be suppressed.

Figure 4:
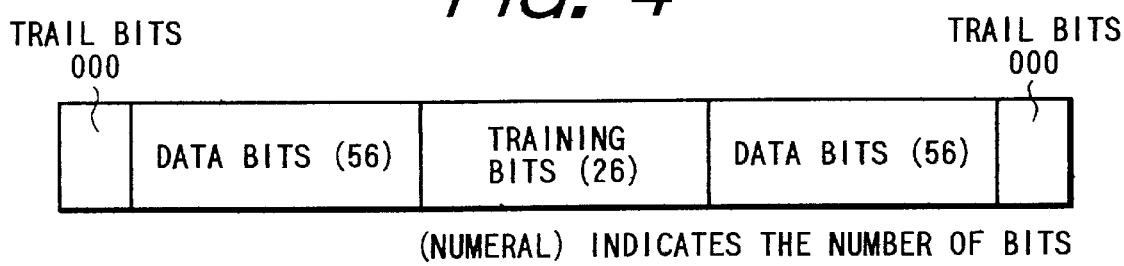
FIG. 4 shows a series of received signals having a burst structure according to Standards of European Global System for Mobile Communications.

In cases where a stream of received signals is transmitted in a burst structure defined according to Standards of European Global System for Mobile Communications, a stream of received signals having the burst structure shown in FIG. 4 is equalized in the equalizing unit 13. In this case, a prescribed known phase difference $\theta d = \eta/2$ defined according to the Standards of European Global System exists in two pieces of phase information A and B arranged at two fixed regions. Therefore, a time changing rate $\theta ab$ according to the Standards of European Global System for Mobile Communications is obtained as follows.

$$\theta ab = \tan^{-1}(AiBq-AqBi)/(AqBq+AiBi)-\eta/2$$

In this case, a phase shift (or a frequency offset) Foff is calculated as follows.

$$Foff = \theta ab/LB*1/(2\eta)*270833 \text{ Hz}$$

Here, the symbol LB denotes a bit interval between the phase information A and B. and LB=145 is satisfied.

(Second Embodiment)

Figure 5:
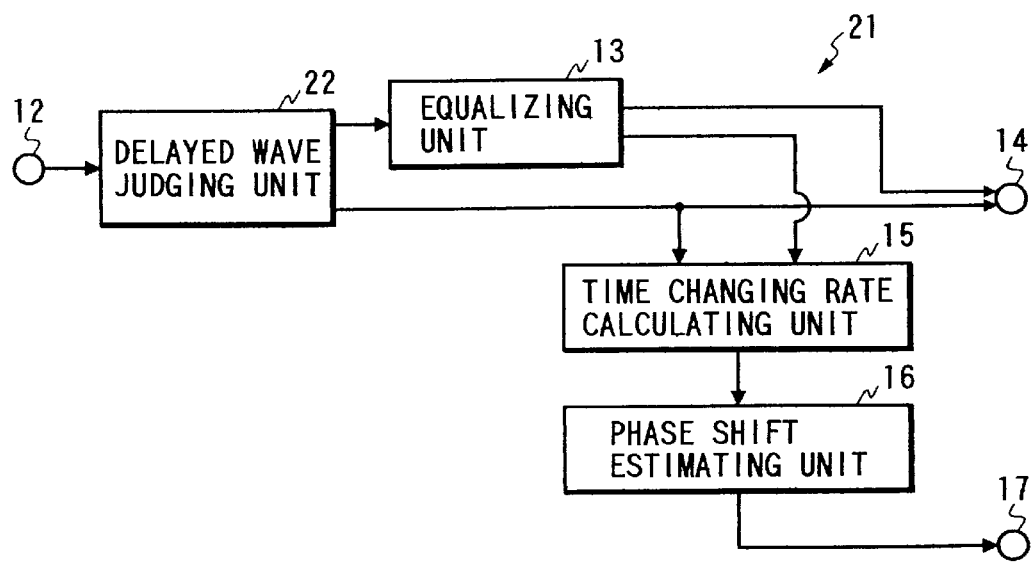
FIG. 5 is a block diagram of an equalizer of a data receiving system according to a second embodiment of the present invention.

FIG. 5 is a block diagram of an equalizer of a data receiving system according to a second embodiment of the present invention.

As shown in FIG. 5, an equalizer 21 of a data receiving system comprises the input terminal 12, the output terminal 14, a delayed wave judging unit 22 for judging whether or not a delayed wave exists in the received signal input to the input terminal 12 and transmitting the received signal to the output terminal 14 not to perform any equalizing processing for the received signal in cases where it is judged that any delayed wave does not exist in the received signal, the equalizing unit 13 for performing an equalizing processing for the received signal to remove a distortion of the received signal in cases where it is judged that a delayed wave exists in the received signal, the time changing rate calculating unit 15 for calculating a time changing rate of phase information which are taken out from a stream of equalized signals generated in the equalizing unit 13 or are taken out from a stream of received signals transmitted from the delayed wave judging unit 22, the phase shift estimating unit 16, and the phase shift outputting terminal 17.

Figure 6:
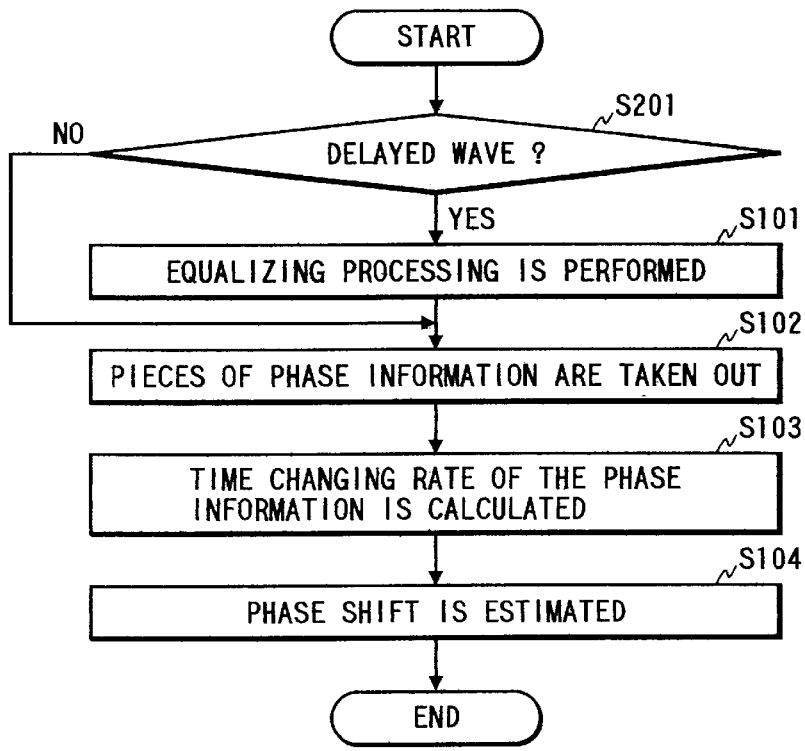
FIG. 6 is a flow chart showing an operation performed in the equalizer of the data receiving system shown.

In the above configuration, the estimation of the phase shift is performed according to the procedure shown in FIG. 6.

As shown in FIG. 6, when a plurality of received signals are input to the input terminal 12 one after another, the received signals are transmitted to the delayed wave judging unit 22 one after another. In the delayed wave judging unit 22, it is judged whether or not a delayed wave exists in a stream of the received signals (step S201). In cases where any delayed wave does not exist, because any distortion caused by a delayed wave does not exist in the stream of the received signals, the received signals are transmitted to the time changing rate calculating unit 15 and the output terminal 14 not to perform any equalizing processing for the received signals in the equalizing unit 13. Thereafter, a phase shift is estimated from the changed angle $\theta ab$ in the phase shift estimating unit 16 (steps S102 to S104) in the same manner as in the first embodiment.

In contrast, in cases where it is judged in the delayed wave judging unit 22 that a delayed wave exist, a distortion of each of the received signals is removed in the equalizing unit 13 (step S101), and a phase shift is estimated from the changed angle $\theta ab$ in the phase shift estimating unit 16 (steps S102 to S104) in the same manner as in the first embodiment.

(Third Embodiment)

Figure 7:
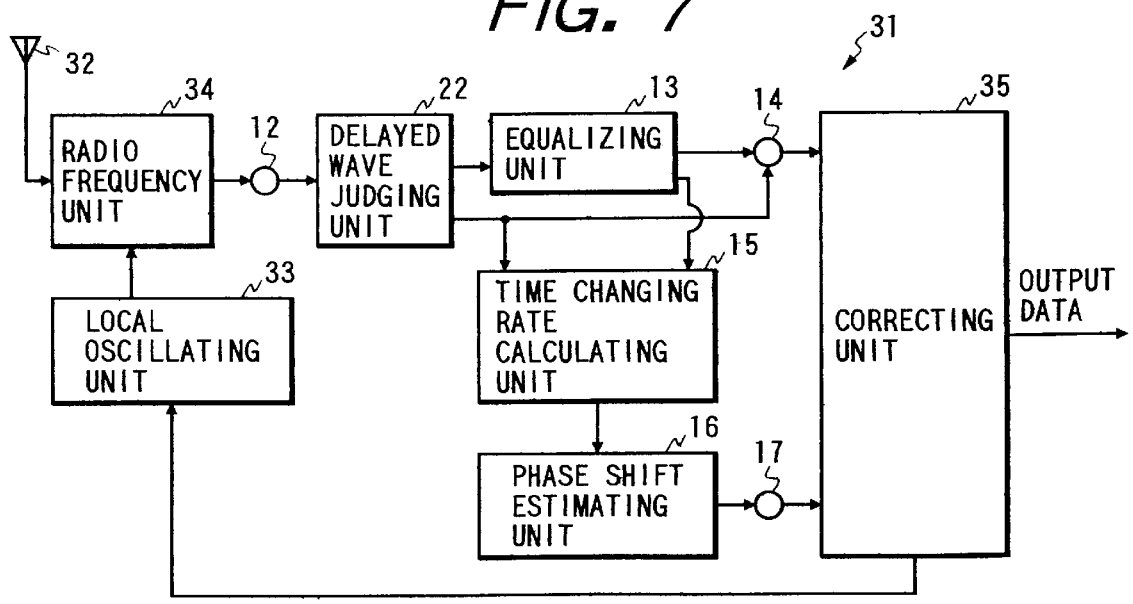
FIG. 7 is a block diagram of a data receiving system according to a third embodiment of the present invention.

FIG. 7 is a block diagram of a data receiving system according to a third embodiment of the present invention.

As shown in FIG. 7, a data receiving system 31 comprises an antenna 32 for receiving a signal transmitted at a carrier wave frequency as a received signal, a local oscillating unit 33 for generating a local oscillating frequency used for the demodulation of the received signal, a radio frequency unit 34 for oscillating the received signal at the local oscillating frequency, the input terminal 12 for inputting the received signal oscillated in the radio frequency unit 34, the delayed wave judging unit 22, the equalizing unit 13, the output terminal 14, the time changing rate calculating unit 15, the phase shift estimating unit 16, the phase shift outputting terminal 17, and a correcting unit 35 for correcting the equalized signals generated in the equalizing unit 13 according to the phase shift estimated in the phase shift estimating unit 16 to remove the phase shift from the equalized signals.

In the above configuration, the estimation of the phase shift is performed in the steps S201, and S101 to S104 in the same manner as in the second embodiment. Thereafter, in the correcting unit 35, the equalized signals generated in the equalizing unit 13 are corrected according to the phase shift estimated in the phase shift estimating unit 16, and a plurality of corrected signals are output as pieces of output data. Also, the phase shift is fed back to the local oscillating unit 33, and a local oscillating frequency is adjusted to set the local oscillating frequency to the carrier wave frequency. That is, because the generation of the phase shift is caused by a difference between the local oscillating frequency and the carrier wave frequency, the local oscillating frequency is adjusted to decrease a value of the phase shift. Thereafter, an adjusted local oscillating frequency is supplied to the radio frequency unit 34. Therefore, a frequency transformation can be performed in the radio frequency unit 34 with a high precision.

Accordingly, because the phase shift caused by a frequency difference between a data transmitting side and a data receiving side is estimated by using the time changing rate of the phase information taken out from the fixed bit regions of a stream of received signals, any error generated by the influence of each bit pattern of a series of training bits does not occur. Therefore, any table value used to correct an offset value for each of the bit patterns is not required.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed:

1. A data receiving system for receiving and demodulating a series of data signals oscillated at a carrier wave frequency on a data transmission side, comprising:

signal receiving means for receiving the series of data signals;

demodulating means for demodulating the series of data signals received by the signal receiving means at a demodulating frequency;

time changing rate calculating means for taking out phase information from the series of data signals demodulated by the demodulating means and calculating a time changing rate of the phase information;

phase shift estimating means for estimating a phase shift caused by a difference between the carrier wave frequency of the series of data signals and the demodulating frequency according to the time changing rate of the phase information calculated by the time changing rate calculating means; and correcting means for removing the phase shift estimated by the phase shift estimating means from the series of data signals demodulated by the demodulating means to produce a series of corrected signals and outputting the series of corrected signals.

2. A data receiving system according to claim 1 in which the series of data signals received by the signal receiving means has a burst structure defined according to Standards of European Global System for Mobile Communication.

3. A data receiving system for receiving and demodulating a series of data signals oscillated at a carrier wave frequency on a data transmission side, comprising:

signal receiving means for receiving the series of data signals;

demodulating means for demodulating the series of data signals received by the signal receiving means at a demodulating frequency;

delayed wave judging means for judging whether or not a delayed wave exists in the series of data signals demodulated by the demodulating means and outputting the series of data signals in cases where the delayed wave does not exist in the series of data signals;

equalizing means for removing a distortion of the series of data signals demodulated by the demodulating means to produce a series of equalized signals from the series of data signals in cases where it is judged by the delayed wave judging means that the delayed wave exists in the series of data signals and outputting the series of equalized signals;

time changing rate calculating means for taking out phase information from the series of equalized signals produced by the equalizing means and calculating a time changing rate of the phase information; and phase shift estimating means for estimating a phase shift caused by a difference between the carrier wave frequency of the series of data signals and the demodulating frequency according to the time changing rate of the phase information calculated by the time changing rate calculating means and outputting the phase shift.

4. A data receiving system according to claim 3 in which the series of data signals received by the signal receiving means has a burst structure defined according to standards of European Global System for Mobile Communication.

5. A data receiving system for receiving and demodulating a series of data signals oscillated at a carrier wave frequency on a data transmission side, comprising:

signal receiving means for receiving the series of data signals;

demodulating means for demodulating the series of data signals received by the signal receiving means at a demodulating frequency;

time changing rate calculating means for taking out phase information from the series of data signals demodulated by the demodulating means and calculating a time changing rate of the phase information, the phase information being placed at both tail regions of the series of data signals received by the signal receiving means; and phase shift estimating means for estimating a phase shift caused by a difference between the carrier wave frequency of the series of data signals and the demodulating frequency according to the time clanging rate of the phase information calculated by the time changing rate calculating means and outputting the phase shift.

6. A data receiving system according to claim 5, further comprising:

correcting means for removing the phase shift estimated by the phase shift estimating means from the series of data signals demodulated by the demodulating means to produce a series of corrected signals and outputting the series of corrected signals.

7. A data receiving system according to claim 5, further comprising:

delayed wave judging means for judging whether or not a delayed wave exists in the series of data signals demodulated by the demodulating means and transmitting the series of data signals to the time changing rate calculating means in cases where the delayed wave exists in the series of data signals; and equalizing means for removing a distortion of the series of data signals demodulated by the demodulating means in cases where it is judged by the delayed wave judging means that the delayed wave exists in the series of data signals and transmitting the series of data signals to the time changing rate calculating means.

8. A data receiving system according to claim 5 in which the series of data signals received by the signal receiving means has a burst structure defined according to Standards of European Global System for Mobile Communication.

* * * * *

UNITED STATES PATENT AND TRADEMARK OFFICE
CERTIFICATE OF CORRECTION

PATENT NO. : 5,809,084
DATED : September 15, 1998
INVENTOR(S) : Kazuo Shida; Mitsuru Uesugi It is certified that error appears in the above-identified patent and that said Letters Patent is hereby corrected as shown below:

On the title page, item [54] and column 1, line 1, after "RECEIVING", insert --SYSTEM--

Signed and Sealed this

Twenty-eighth Day of September, 1999

Attest:

Q. TODD DICKINSON

Attesting Officer

Acting Commissioner of Patents and Trademarks